United States Patent
Wu et al.

(10) Patent No.: US 10,313,537 B2
(45) Date of Patent: Jun. 4, 2019

(54) METHOD, APPARATUS AND MEDIUM FOR SHARING PHOTO

(71) Applicant: Beijing Xiaomi Mobile Software Co., Ltd., Haidian District, Beijing (CN)

(72) Inventors: Siliang Wu, Beijing (CN); Xuan Ma, Beijing (CN); Xiaoyin Li, Beijing (CN); Xinyan Xing, Beijing (CN); Fucheng Zhang, Beijing (CN); Lei Xiong, Beijing (CN)

(73) Assignee: BEIJING XIAOMI MOBILE SOFTWARE CO., LTD., Haidian District, Beijing (CN)

(*) Notice: Subject to any disclaimer, the term of this patent is extended or adjusted under 35 U.S.C. 154(b) by 0 days.

(21) Appl. No.: 15/470,922

(22) Filed: Mar. 28, 2017

(65) Prior Publication Data
US 2017/0374208 A1  Dec. 28, 2017

(30) Foreign Application Priority Data
Jun. 23, 2016 (CN) .......................... 2016 1 0466978

(51) Int. Cl.
  *H04N 1/00* (2006.01)
  *G06K 9/00* (2006.01)
  *G06F 16/583* (2019.01)

(52) U.S. Cl.
  CPC ....... *H04N 1/00212* (2013.01); *G06F 16/583* (2019.01); *G06K 9/00255* (2013.01); *G06K 9/00288* (2013.01); *G06K 9/00677* (2013.01)

(58) Field of Classification Search
  CPC .......... G06K 9/00288; G06K 9/00677; G06K 9/00255; H04N 1/00212

USPC ......................................................... 382/118
See application file for complete search history.

(56) References Cited

U.S. PATENT DOCUMENTS

| 2012/0134545 A1 | 5/2012 | Lai |
| 2015/0227782 A1 | 8/2015 | Salvador et al. |
| 2015/0331861 A1* | 11/2015 | Tai ..................... G06K 9/00677 707/613 |
| 2017/0032188 A1* | 2/2017 | Zhang ............... G06F 17/30047 |

FOREIGN PATENT DOCUMENTS

| CN | 103235814 | 8/2013 |
| CN | 104199973 A | 12/2014 |
| CN | 104317932 A | 1/2015 |
| WO | 2011017653 A1 | 2/2011 |

OTHER PUBLICATIONS

Extended European Search Report for European application No. 17161636.0, dated Sep. 25, 2017.
The First Office Action in Chinese application No. 201610466978.6, dated Nov. 29, 2018.

* cited by examiner

*Primary Examiner* — Daniel G Mariam
(74) *Attorney, Agent, or Firm* — Jun He Law Offices P.C.; James J. Zhu

(57) ABSTRACT

A method, apparatus and medium for sharing a photo are provided. The method includes: determining a target user for an operation; acquiring a target photo containing a physical characteristic of the target user from stored photos; and sending the target photo to a communication client of the target user.

13 Claims, 5 Drawing Sheets

METHOD, APPARATUS AND MEDIUM FOR SHARING PHOTO

CROSS-REFERENCE TO RELATED APPLICATION

This application claims priority to and benefits of Chinese Patent Application Serial No. 201610466978.6, filed with the State Intellectual Property Office of P. R. China on Jun. 23, 2016, the entire content of which is incorporated herein by reference.

FIELD

The present disclosure relates to the field of virtual social communication technology, and more particularly to a method, apparatus and medium for sharing a photo.

BACKGROUND

Typically, common social sharing technologies support interactions between users, but do not actively prompt an operator to send photos to the opposite side. User social technologies are limited to active operations between users only, when a user wants to send a photo of a friend to the friend, the user needs to manually search the photo of the friend first, then sends the manually-found photo of the friend to the friend. Thus in the whole process, the user needs to perform the steps of searching, sending and etc., the operation is complicated.

SUMMARY

According to a first aspect of embodiments of the present disclosure, there is provided a method for sharing a photo. The method includes: determining a target user for an operation; acquiring a target photo containing a physical characteristic of the target user from stored photos; and sending the target photo to a communication client of the target user.

According to a second aspect of embodiments of the present disclosure, there is provided a device for sharing a photo. The device includes: a processor; a memory for storing instructions executable by the processor; wherein, the processor is configured to: determine a target user related the operation; acquire a target photo containing a physical characteristic of the target user from stored photos; and send the target photo to a communication client of the target user.

According to a third aspect of embodiments of the present disclosure, there is provided a non-transitory computer-readable storage medium having stored therein instructions that, when executed by a processor of a terminal, causes the terminal to perform a method for sharing a photo, the method including: determining a target user for an operation; acquiring a target photo containing a physical characteristic of the target user from stored photos; and sending the target photo to a communication client of the target user.

It should be appreciated that the general description above and the following detailed description are just exemplary and illustrative, thus should not be seen as any restriction to the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
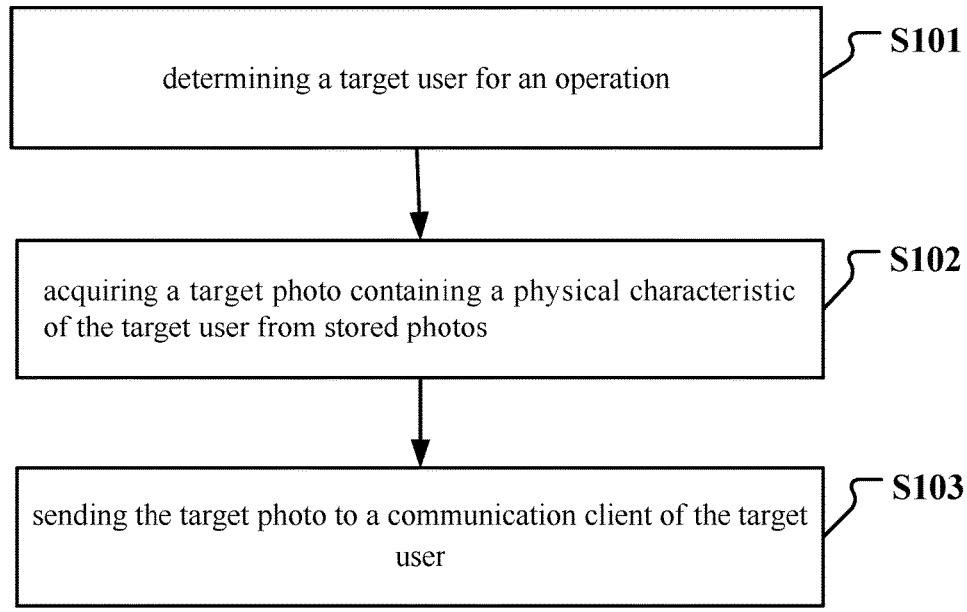
FIG. 1 is a flow chart showing a method for sharing a photo according to an example embodiment.

FIG. 1 is a flow chart showing a method for sharing a photo according to an example embodiment, the method could be used in a terminal or in a system or program which controls a terminal.

As shown in FIG. 1, the method includes the following steps.

In step S101, a target user for an operation is determined.

In an embodiment, "operation" may include a communication operation or a shooting operation. Communication operations may include all kinds of communication ways, for example requesting a photo from a target user, exchanging instant messages with a target user or communicating with a target user etc. A shooting operation may include various ways such as taking a photo of a target user, choosing a photo of a target user or obtaining a head portrait photo of a target user from existing photos.

In step S102, a target photo containing a physical characteristic of the target user is acquired from stored photos.

In an embodiment, above stored photos may be photos stored in local storage or in a cloud service network such as cloud photo album. Or, the photos may be stored in any memory device. A physical characteristic of a target user may be any characteristic information that can represent a body feature of a target user such as hand characteristic, leg characteristic, characteristic of the upper part of a body, etc. In an embodiment, since everybody has a unique face, facial characteristic can represent a user's physical characteristic uniquely without bringing confusions with other users, thus the physical characteristic of a target user could be a facial characteristic of the target user, so that the target photo determined accordingly can be more accurate.

With step S102, automatic acquisition of a target photo containing a physical characteristic of the target user from the photos already stored may be realized, so that there's no need for a user to search manually.

In step S103, the target photo is sent to a communication client of the target user.

The communication client could be any terminal that can accomplish communication, such as a mobile phone, a panel computer, a hand held communication terminal, a computer or. Also, it could be client software.

With the above method provided by the present disclosure, a target user for an operation is determined, photos of the target user may be automatically organized and sent to the target user by using big data and facial recognition technology, the operation is simple without the need of searching for photo manually, thus improving the user's experience.

Figure 2:
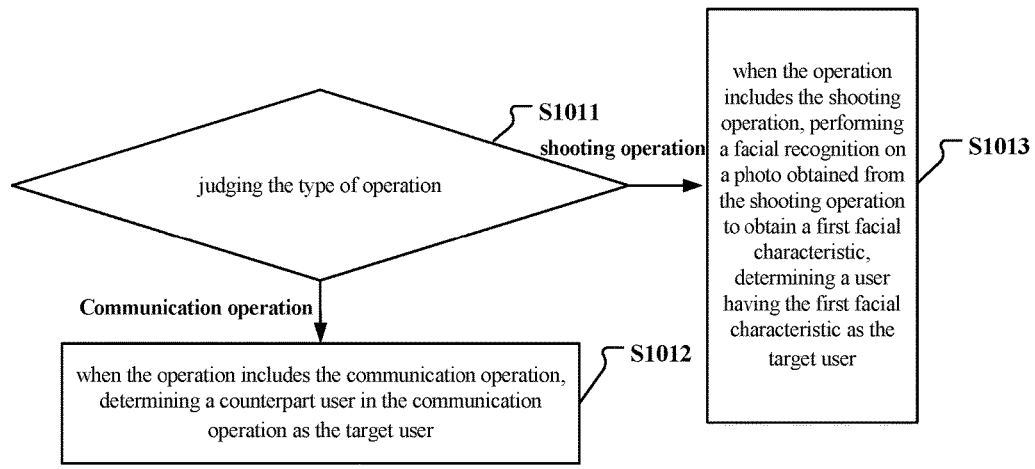
FIG. 2 is a flow chart showing a method for determining a target user corresponding to an operation type according to an example embodiment.

In an embodiment, as shown in FIG. 2, the step S101 may include the following steps.

In step S1011, the type of operation is judged. If the type of operation is a communication operation, then step S1012 is executed; if the type of operation is a shooting operation, then step S1013 is executed.

In step S1012, when the operation includes the communication operation, determining a target user for the operation includes: determining a counterpart user in the communication operation as the target user.

In step S1013, when the operation includes the shooting operation, determining a target user for the operation includes: performing a facial recognition on a photo obtained from the shooting operation and obtaining a first facial characteristic, determining a user having the first facial characteristic as the target user.

In this embodiment, according to different types of operations, different determining methods are used to determine the target user for the operation.

Figure 3:
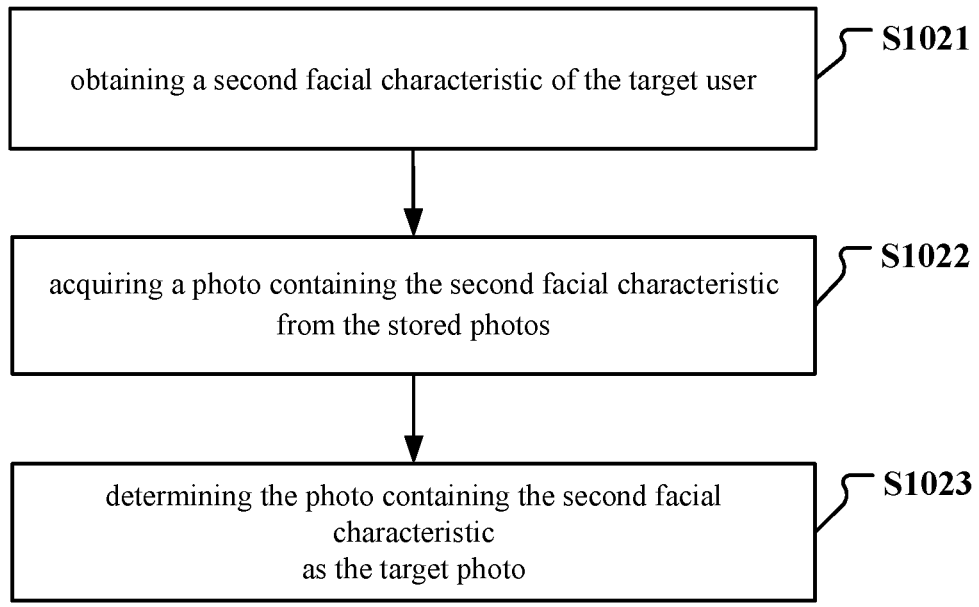
FIG. 3 is a flow chart showing a method for choosing a target photo according to an example embodiment.

In an embodiment, as shown in FIG. 3, which is a flow chart showing a method for choosing a target photo in the step S102, the method includes the following steps.

In step S1021, a second facial characteristic of the target user is obtained.

In an embodiment, the second facial characteristic may be obtained by also adopting the facial recognition technology to obtain the second facial characteristic of the target user. If the target user is determined by a communication operation, then the facial recognition is performed according to a head portrait of the target user. If the target user is determined by a shooting operation, then the facial recognition is performed according to a shot photo directly.

In step S1022, a photo containing the second facial characteristic is acquired from the stored photos.

In an embodiment, it needs to verify the stored photos one by one so as to determine whether a stored photo contains the second facial characteristic, the stored photos including group photos of the target user and others and photos of the target user.

In step S1023, the photo containing the second facial characteristic is determined as the target photo.

In an embodiment, the photo containing the second facial characteristic is determined as the target photo after the traverse of all stored photos. If there are too many photos or there are certain configurations set by the user, the user may choose to filter some of the target photos.

The photo(s) containing the second facial characteristic of the target user may be acquired from the photos stored in the communication client or from the photos stored in a cloud photo album. For example, a user could choose the target photo(s) from his/her mobile phone or other communication clients, and/or could also choose the target photo(s) from his/her corresponding cloud photo album, and/or could choose the target photo(s) from other devices through local area network or other connections as well.

In an embodiment, in above step S103, the target photo determined in above step S102 is sent to a communication client of the target user. In an embodiment, above step S102 may determine multiple photos as the target photos, whereby, in step S103 a prompt message can be provided to prompt the user to choose some or all of the photos to be sent to the target user. Alternatively, a user may set whether to choose photos to be sent by himself/herself, such that individual requirements of different users may be met, thus improving the users' experiences. In another embodiment, the physical characteristic of each user such as facial characteristic and a communication client identification of the user can be stored in association with each other in advance to construct a correspondence, such that, when step S103 is executed, the communication client identification corresponding to a physical characteristic of the target user can be automatically found in the correspondence, and then the target photo(s) can be sent to the communication client corresponding to the found communication client identification.

Now the implementation of the method according to an embodiment of the present disclosure will be illustrated with reference to a communication operation and a shooting operation separately.

When the operation is a communication operation, for example a communication operation of requesting photos from a target user, when a user requests photos from a target user through an instant messaging tool, photos of the target user may be searched for from photos stored in local or cloud photo album and photos such as head portrait photos could be obtained, then a physical characteristic of the target user may be obtained via the facial recognition, and all the photos that contain the physical characteristic of the target user may be found from the photos stored in local or cloud photo album by comparison and searching, and the found photos are determined as target photos. The target photos are sent to a communication client of the target user.

When the operation is a shooting operation, for example a shooting operation of taking a picture of a target user, the user takes a picture of the target user, or chooses a photo containing the target user from the photos stored in local or cloud photo album, then a physical characteristic of the target user on the shot picture or the chosen photo could be obtained via a facial recognition or other way, and all the photos that contain the physical characteristic of the target user may be found from the photos stored in local or cloud photo album by comparison and searching, and the found photos are determined as target photos. The target photos are sent to a communication client of the target user.

Figure 4:
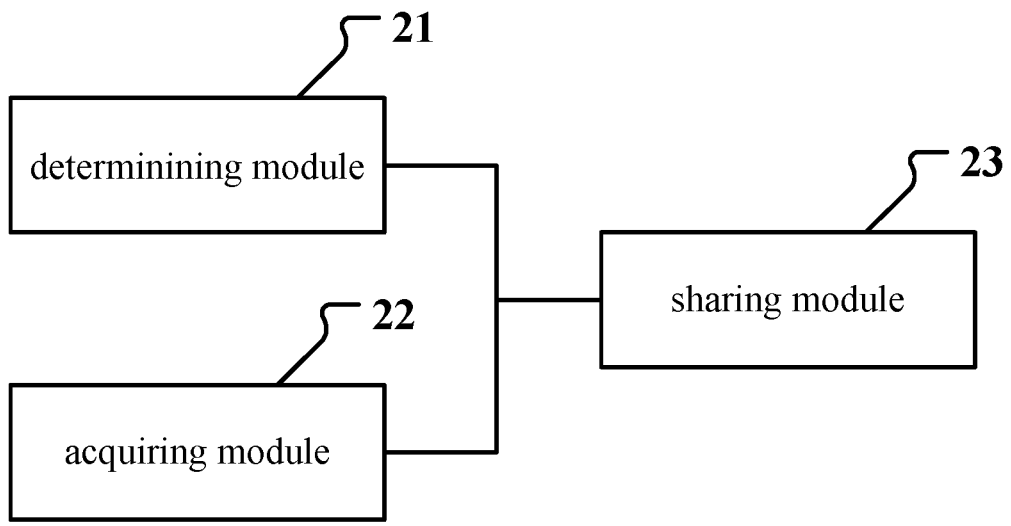
FIG. 4 is a block diagram showing an apparatus for sharing a photo according to an example embodiment.

FIG. 4 is a block diagram showing an apparatus for sharing a photo according to an example embodiment. With reference to FIG. 4, the apparatus includes a determining module 21, an acquiring module 22, and a sharing module 23.

The determining module 21 is configured to determine a target user for an operation.

The acquiring module 22 is configured to acquire a target photo containing a physical characteristic of the target user determined by the determining module 21 from stored photos.

The sharing module 23 is configured to send the target photo acquired by the acquiring module 22 to a communication client of the target user.

In an embodiment, above operation includes a communication operation or a shooting operation.

In an embodiment, a communication operation includes any one of followings: requesting a photo from a target user, exchanging instant messages with a target user or communicating with a target user.

Figure 5:
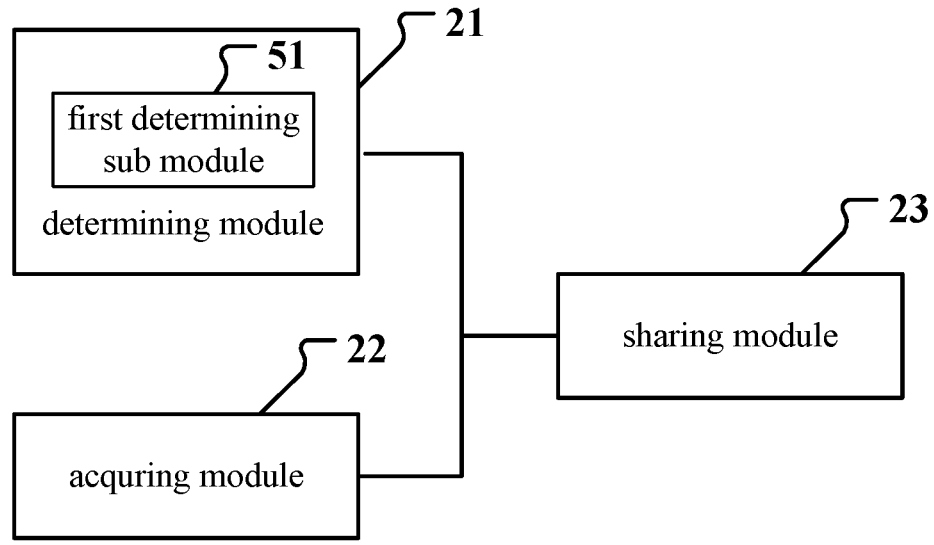
FIG. 5 is a block diagram showing an apparatus for sharing a photo according to another example embodiment.

In an embodiment, as shown in FIG. 5, above determining module 21, also includes: a first determining sub module 51, configured to determine a user on the opposite side of the communication operation as the target user, when the operation includes the communication operation.

Figure 6:
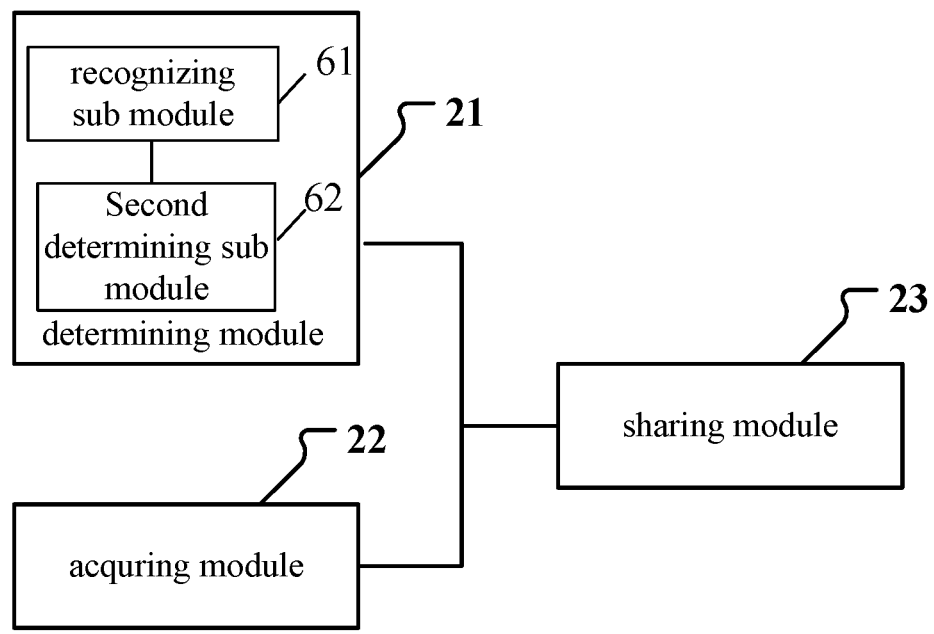
FIG. 6 is a block diagram showing an apparatus for sharing a photo according to yet other example embodiment.

In an embodiment, as shown in FIG. 6, above determining module 21, also includes a recognizing sub module 61, and a second determining sub module 62.

The recognizing sub module 61 is configured to perform a facial recognition on a photo obtained from the shooting operation and to obtain a first facial characteristic, when the operation includes the shooting operation.

The second determining sub module 62 is configured to determine a user having the first facial characteristic as the target user.

Figure 7:
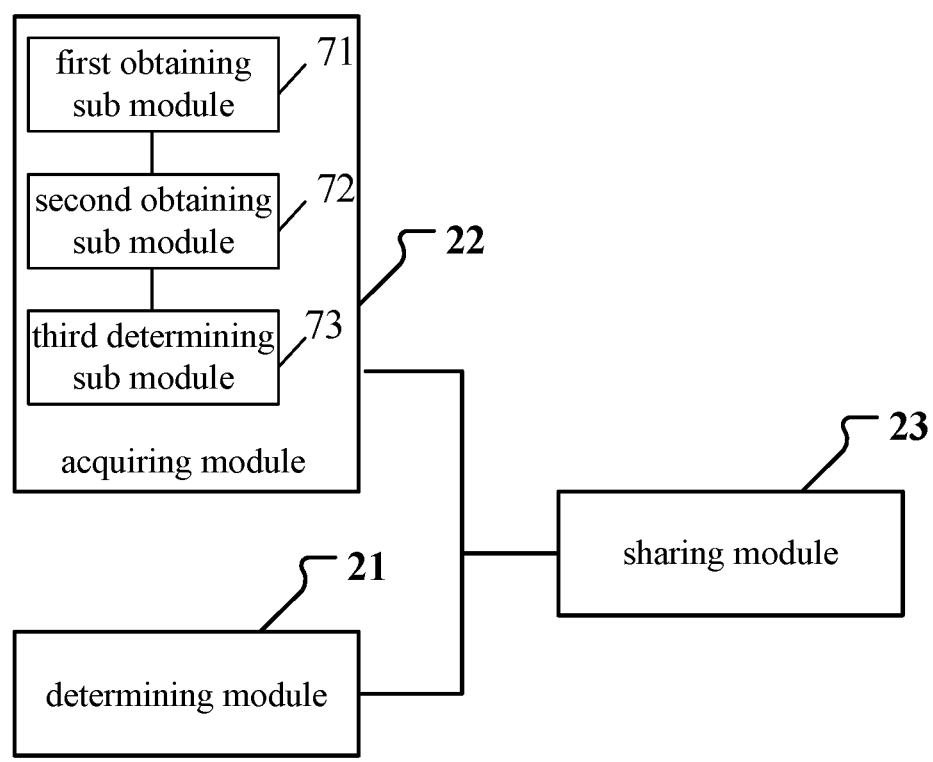
FIG. 7 is a block diagram showing an apparatus for sharing a photo according to yet other example embodiment.

In an embodiment, as shown in FIG. 7, above acquiring module 22, also includes a first obtaining sub module 71, a second obtaining sub module 72, and a third determining sub module 73.

The first obtaining sub module 71 is configured to obtain a second facial characteristic of the target user.

The second obtaining sub module 72 is configured to acquire a photo containing the second facial characteristic from the stored photos.

The third determining sub module 73 is configured to determine a photo containing the second facial characteristic as the target photo.

In an embodiment, the second obtaining sub module 72 is also configured to perform any one of the following operations: acquiring the photo containing the second facial characteristic of the target user from photos stored in the communication client; acquiring the photo containing the second facial characteristic of the target user from photos stored in a cloud photo album.

With the solutions provided by the present disclosure, a target user for an operation is determined, photos of the target user may be automatically organized and sent to the target user by using big data and facial recognition technology, the operation is simple without the need of searching for photo manually, thus improving the user's experience.

With regard to the device of the above embodiment, the specific operation manners for individual modules therein refer to those described in detail in the embodiments regarding the methods, which are not elaborated herein again.

The present disclosure also provides a non-transitory computer readable storage medium, when instructions stored in the storage medium is executed by a processor of the terminal, the terminal is caused to perform a method for sharing a photo, the method including: determining a target user for an operation; acquiring a target photo containing a physical characteristic of the target user from stored photos; and sending the target photo to a communication client of the target user.

In an embodiment, the operation includes a communication operation or a shooting operation.

In an embodiment, when the operation includes the communication operation, determining a target user for an operation includes: determining a counterpart user in the communication operation as the target user; when the operation includes the shooting operation, determining a target user for an operation includes: performing a facial recognition on a photo obtained from the shooting operation and obtaining a first facial characteristic, determining a user having the first facial characteristic as the target user.

In an embodiment, the communication operation includes any one of the followings: requesting a photo from the target user, exchanging instant messages with the target user or communicating with the target user.

In an embodiment, acquiring a target photo containing a physical characteristic of the target user from stored photos includes: obtaining a second facial characteristic of the target user; acquiring a photo containing the second facial characteristic from the stored photos; and determining the photo containing the second facial characteristic as the target photo.

In an embodiment, acquiring a photo containing the second facial characteristic from the stored photos includes any one of the following operations: acquiring the photo containing the second facial characteristic of the target user from photos stored in the communication client; acquiring the photo containing the second facial characteristic of the target user from photos stored in a cloud photo album.

An embodiment of the present disclosure also provides a terminal control device, including: a processor; a memory for storing instructions executable by the processor; in which, the processor is configured to: determine a target user for an operation; acquire a target photo containing a physical characteristic of the target user from stored photos; and send the target photo to a communication client of the target user.

Figure 8:
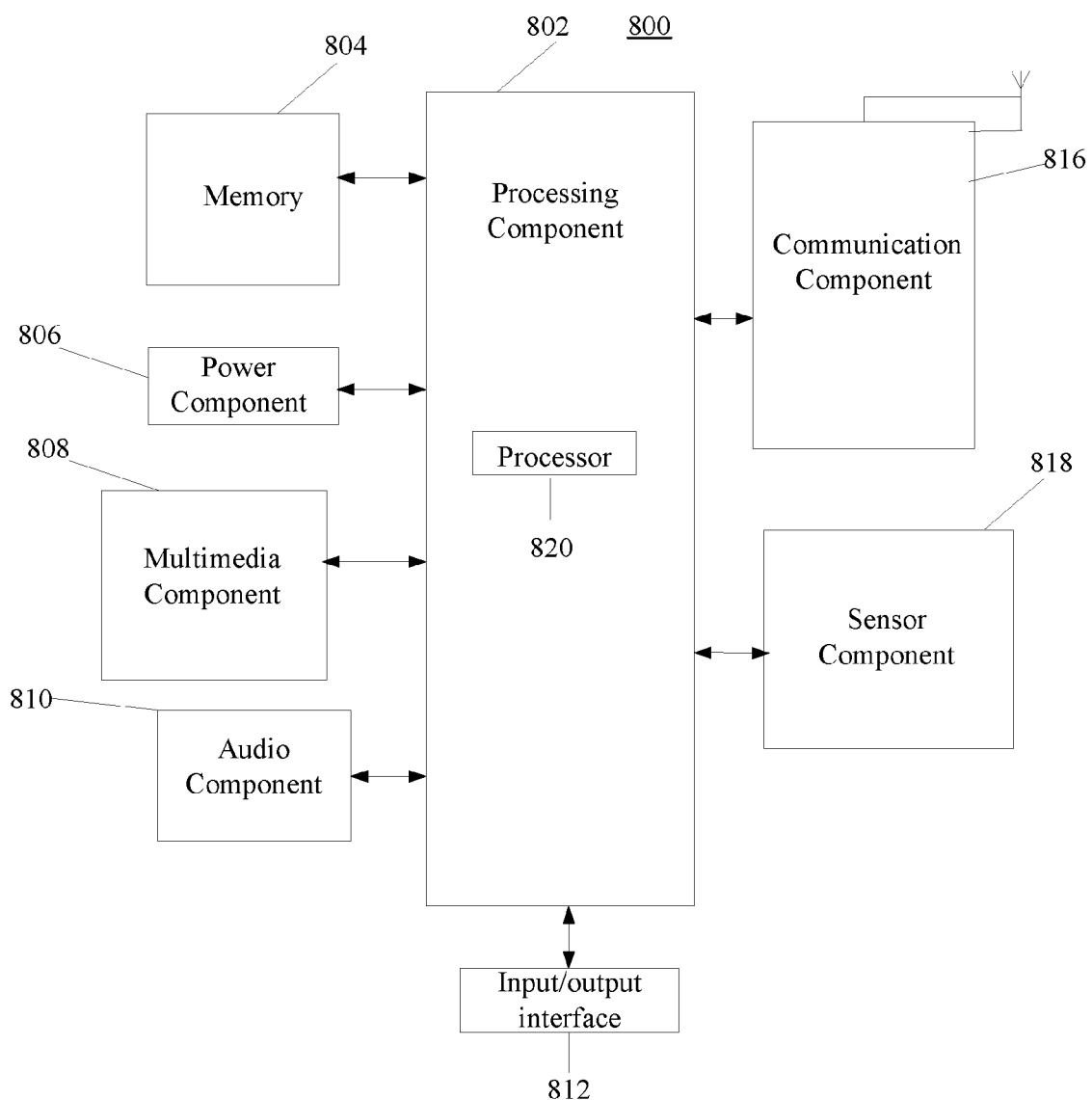
FIG. 8 is a block diagram showing a device for sharing a photo according to an example embodiment.

FIG. 8 is a block diagram showing a device 800 for sharing a photo according to an example embodiment. For example, device 800 could be a camera device, such as a mobile phone, a computer, a digital broadcast terminal, a messaging device, a gaming console, a tablet, a medical device, an exercise equipment, a personal digital assistant which has a camera function, and the like.

With reference to FIG. 8, device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 804 including instructions, the above instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Other embodiments will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sharing a photo, implemented by an apparatus, comprising:
    determining a target user related to a communication operation comprising at least one of followings: requesting a photo from said target user, exchanging instant messages with said target user or communicating with said target user;
    acquiring a profile picture of said target user;
    recognizing a physical characteristic of said target user according to the profile picture;
    acquiring a target photo containing the physical characteristic of said target user from stored photos; and
    sending said target photo to a communication client of said target user.

2. The method according to claim 1, wherein determining a target user related to a communication operation comprises:
    determining an other user related to said communication operation as said target user.

3. The method according to claim 1, wherein, acquiring said target photo containing a physical characteristic of said target user from stored photos comprises:
    obtaining a second facial characteristic of said target user;
    acquiring a photo containing said second facial characteristic from the stored photos; and determining the photo containing said second facial characteristic as said target photo.

4. The method according to claim 3, wherein, said acquiring a photo containing said second facial characteristic from the stored photos comprises at least one of following operations:

acquiring the photo containing the second facial characteristic of said target user from photos stored in the communication client;

acquiring the photo containing the second facial characteristic of said target user from photos stored in a cloud photo album.

5. The method according to claim 1, wherein, the physical characteristic is a facial characteristic of the target user.

6. The method according to claim 1, wherein, if there are a plurality of target photos, the method further comprises:

filtering the plurality of target photos to obtain a target photo to be sent;

and sending said target photo to a communication client of said target user comprises:

sending to the communication client of said target user the target photo to be sent.

7. An apparatus for sharing a photo, wherein, comprising:
a processor;
a memory for storing instructions executable by the processor;
wherein, said processor is configured to:
determine a target user related to a communication operation comprising at least one of followings: requesting a photo from said target user, exchanging instant messages with said target user or communicating with said target user;
acquire a profile picture of said target user;
recognize a physical characteristic of said target user according to the profile picture;
acquire a target photo containing the physical characteristic of said target user from stored photos; and
send said target photo to a communication client of said target user.

8. The apparatus according to claim 7, wherein the processor is configured to determine a target user related to an operation by determining an other user related to said communication operation as said target user.

9. The apparatus according to claim 7, wherein, the processor is configured to acquire said target photo containing a physical characteristic of said target user from stored photos by acts of:

obtaining a second facial characteristic of said target user;

acquiring a photo containing said second facial characteristic from the stored photos; and determining the photo containing said second facial characteristic as said target photo.

10. The apparatus according to claim 9, wherein, said acquiring a photo containing said second facial characteristic from the stored photos comprises at least one of following operations:

acquiring the photo containing the second facial characteristic of said target user from photos stored in the communication client;

acquiring the photo containing the second facial characteristic of said target user from photos stored in a cloud photo album.

11. The apparatus according to claim 7, wherein, the physical characteristic is a facial characteristic of the target user.

12. The apparatus according to claim 7, wherein, if there are a plurality of target photos, the processor is further configured to filter the plurality of target photos to obtain a target photo to be sent; and send to the communication client of said target user the target photo to be sent.

13. A non-transitory computer-readable storage medium having stored therein instructions that, when executed by a processor of a terminal, causes the terminal to perform a method for sharing a photo, comprising:

determining a target user related to a communication operation comprising at least one of followings: requesting a photo from said target user, exchanging instant messages with said target user or communicating with said target user;

acquiring a profile picture of said target user;

recognizing a physical characteristic of said target user according to the profile picture;

acquiring a target photo containing the physical characteristic of said target user from stored photos; and sending said target photo to a communication client of said target user.

* * * * *